Reissued May 24, 1949 Re. 23,115

UNITED STATES PATENT OFFICE 23,115

PLANT REGULANT COMPOSITION AND METHOD

John F. Lontz, Nutley, N. J., assignor to E. I. du Pont de Nemours & Company, Wilmington, Del., a corporation of Delaware No Drawing. Original No. 2,322,761, dated June 29, 1943, Serial No. 431,696, February 20, 1942. Application for reissue June 26, 1948, Serial No. 35,516

10 Claims. (Cl. 47—58)

This invention relates to plant regulants and is particularly directed to plant regulant compositions containing as an essential active ingredient a monocarboxylic acid having one of its carbon atoms linked to a nuclear halogenated aromatic ring by means of a polyvalent, strongly negative, non-metallic atom, namely, oxygen, sulfur and nitrogen (imino), and to methods in which the growth characteristics of plants are modified by the application of such compounds.

In the science of phytology, or plant physiology, it is universally recognized that certain factors regarded as growth regulators or growth-promoting substances are responsible for the fundamental and directive development of plant life. These regulators have been isolated from vegetative and reproductive parts of a variety of plants, pollens, the endosperm of many seeds, fungi, and urine and have been identified as to their chemical structure. In addition, a number of synthetic compounds displaying regulatory effects similar to those of the naturally occurring products have also been discovered. These plant growth substances, also known as auxins, plant hormones, plant growth stimulants, and referred to herein simply as "plant regulants," in very minute quantities control or regulate the growth of the plant cell, a property which can be determined qualitatively and quantitatively by such standard test procedures known as the *Avena coleoptile* curvature test of Boysen-Jensen ("Growth Hormones in Plants," translated and revised by G. S. Avery, Jr., and P. R. Burkholder. McGraw-Hill, New York), the Avena cylinder or straight growth test of Thimann (Proc. Acad. Sci., Amsterdam, vol. 38, p. 896–912 (1935)), the split pea stem curvature test of Went (Proc. Acad. Sci., Amsterdam, vol. 37, p. 547 (1934)), and the green tissue test of Hitchcock and Zimmerman (Contributions from Boyce-Thompson Institute, vol. 9, No. 5, p. 463–518 (1938)).

While fundamentally these substances control the development of the cell, particularly its elongation and division, the total or superficial responses to these substances are manifested in such various ways as inducing nastic movement, bending and swelling, proliferation, and overgrowth of leaves and stems, control of root growth, development of callous tissue, increased cambial activity, deposition of new cell wall and abscission tissue, and the initiation of new roots on stems and leaves. The practical aspects of these properties include propagation of plants from cuttings, hastening of flower bud formation, "hormonization" of cereal grains for controlling germination and growth, parthenogenic development of fruit, delaying or controlling the fall of leaves, buds and fruit, and inhibiting sprouting, budding, or flowering.

In the successful application of plant regulants to various of these purposes it is important that the concentration of the compound in a suitable treating medium and the time of treatment, both of which, particularly with some compounds, are highly critical, be adjusted carefully. If this concentration/time factor is exceeded by using either a higher concentration or longer treating time the regulating effect may vanish and instead considerable injury to the plant develop.

Of the various types of known plant regulants, a summary of which may be found in U. S. Patent 2,220,505, 1-naphthaleneacetic acid has probably obtained the most significance in the art. On the basis of cost efficiency and ease of synthesis it appears to be most outstanding, yet its synthesis is by no means simple and its range of tolerance is too sharp to provide sufficient margin of safety in the hands of unskilled workmen.

I have now found that aliphatic monocarboxylic acids having a carbon atom linked to a nuclear halogenated aromatic ring through a strongly negative, polyvalent, non-metallic atom have plant regulating properties. My observations indicate that the nuclear halogen substituent intensifies weak or latent hormone activity or imparts hormone-like activity without apparently affecting the plant tolerance so that the nuclear halogenated compounds of my invention may be applied to plants for the purpose of regulating the growth characteristics with a large measure of success and a wide margin of safety.

The strongly negative, polyvalent, non-metallic atoms, oxygen, sulfur, nitrogen (imino), are similarly characterized in that they are thrice removed in the periodic system from a metallic element in the sense that boron is once removed from beryllium, carbon twice removed, and nitrogen thrice removed, and are recognized in the art as having kindred effects as to distribution of electrons in compounds of which they form a part.

The compounds to which this invention relates are all characterized by having a nuclear halogenated aromatic ring linked through such a strongly negative polyvalent atom to a carbon atom of an aliphatic monocarboxylic acid. They may be represented by the general formula $X_n$—R—A—R'—COOH wherein X is a halogen, $n$ is an integer, R is an aromatic ring, A is oxygen, sulfur or imino nitrogen (—NH—), and R' is a bivalent hydrocarbon radical having carbon atom attachment to A. R' preferably is aliphatic and has less than nine carbon atoms.

Thus, X may be any of the halogens, chlorine, bromine, iodine, or fluorine, the preferred halogen being chlorine or bromine, of which the more preferred is chlorine. From the standpoint of the number of halogens on the aromatic ring as represented by the integer $n$, it is preferable that the number be not greater than 2, still more preferably that it be one. The reason for this preference is the fact that injury to plants increases with the increasing number of halogens, the greater the number the greater the injury. In the case of mono-halogen derivatives substituents in the ortho- and para-positions are preferred to those of the meta. Mixtures of these position isomers are suitable for this use. Also, more highly halogenated compounds may be used though the plant tolerance is generally less.

The radical R is an aromatic ring radical such as phenyl, naphthyl, phenanthryl, anthracyl, indolyl, quinolinyl, etc., phenyl being the preferred type. The group A is represented by —O—, —S—, and —NH— groups, and the group —R'COOH represents the radical of a monocarboxylic acid, for example, the radical which is left when hydrogen is severed from carbon in a fatty acid or other monocarboxylic acid. The acid should have at least two and preferably not more than nine carbon atoms. Unless the free acid is specified it is intended that the ester, amide and salt, preferably the water-soluble types, are included by reason of equivalency. For example, the acid may be "fixed" as the sodium or potassium salt, the unsubstituted amide or the esters of lower aliphatic alcohols. R' preferably is alkylene or arylene, and the group —R'COOH may be the radical of benzoic acid, acetic acid, propionic acid, butyric acid, etc.

The nuclear halogenated compounds of this invention may for the most part be synthesized from available raw materials economically and without difficulty. The haloaryloxy acetic acids are conveniently obtained from halogenated phenols and chloracetic acid in the presence of alkali. In this way para-chlorophenol, chloroacetic acid and sodium hydroxide yield 4-chlorophenoxyacetic acid. The mercapto compounds may be prepared in a similar manner by using halogenated thiophenols, while the halogenated N-phenyl-glycines can also be obtained from nuclear halogenated anilines. For example, N-(4-chlorophenyl)-glycine is obtained from para-chloroaniline and chloroacetic acid in the presence of sodium hydroxide. This compound can also be obtained in another way from para-chloroaniline, formaldehyde and sodium cyanide through the intermediate nitrile which is hydrolyzed to the acid according to the procedure described in Berichte 41, p. 3792. All of these intermediates are readily available raw materials and the syntheses are easily carried out.

By one or the other of the methods outlined above, or by any other suitable method, numerous compounds having the characteristic structure of nuclear halogenated compounds having an aromatic nucleus linked through a strongly negative, polyvalent, non-metallic atom to the residue of a monocarboxylic acid may be prepared. The following compounds are illustrative:

2-chlorophenoxyacetic acid
4-bromophenoxyacetic acid
4-iodophenoxyacetic acid
2-chlorophenylmercaptoacetic acid
4-chlorophenylmercaptoacetic acid
4-iodophenylmercaptoacetic acid
2-chlorophenyliminoacetic acid (N-(2-chlorophenyl) glycine)
4-chlorophenyliminoacetic acid (N-(4-chlorophenyl) glycine)
4-bromophenyliminoacetic acid (N-(4-bromophenyl) glycine)
2,4-dichlorophenoxyacetic acid
2,4-dibromophenylmercaptoacetic acid
2,4-dichlorophenyliminoacetic acid (N-(2,4-dichlorophenyl) glycine)
2-chloro-1-naphthoxyacetic acid
4-chloro-1-naphthyliminoacetic acid
2,4-dichloro-1-naphthoxyacetic acid The compounds of this invention may be used in a variety of ways to regulate the growth characteristics of the plant. For example, they may be applied to cuttings to stimulate root formation, they may be applied to ornamental plants to delay fall of leaves and needles; they may be applied to fruit trees to delay or prevent preharvest drop, they may be applied to seed tubers and the like for regulating germination, to stimulate or inhibit sprouting, or to stimulate development of roots; they may be used for "fortifying" fertilizers and plant food; and they may be used in the production of parthenocarpic or seedless varieties of fruits and berries. In their various applications they may be used on seeds or mature plants to regulate the development of the plants when desired to avoid drought, frost and other adverse conditions, or to stimulate root activity in cuttings or transplanted plants, or to modify the abscission cells to prevent premature drop of buds, leaves, and fruit, particularly apples. In all their applications they are applied to living plant cells in such concentrations as will regulate or control the growth characteristics of the plant. For the purpose of this invention it will be understood that the term "plant" as used herein and in the appended claims is intended to include seeds.

In the application of the compound for these various purposes different compositions may be employed. For the most part aqueous solutions will be found most desirable. These solutions may include wetting agents or adhesives, or both. Colloidal materials such as the soluble gums or resins may be included; also, water-soluble polymers such as polyvinyl alcohol. The compounds also may be applied in admixture with other diluents either as pastes or dusts. Thus the materials may be incorporated in oils, fats, or similar vehicles such as lanolin, olive oil, paraffin oil, lard or hydrogenated vegetable oils, or in a finely divided inert material such as talc, flour, fuller's earth, clay or other soluble or insoluble finely divided solids.

According to one form of my invention the compound is applied to cuttings. Typical applications are given in the following examples:

*Example 1*

A series of 20 carnation cuttings is soaked for 3½ hours with an aqueous solution containing 60 milligrams of 2-chlorophenoxyacetic acid per liter, while another series is simply soaked in water for purposes of comparison. The cuttings are then placed in clean sand and watered occasionally. After three weeks they are examined for the extent of rooting. The results are indicated by the following table.

| Series | Extent of Rooting | | | |
|---|---|---|---|---|
| | Heavy | Medium | Light | No Roots |
| Water check | 1 | 2 | 9 | 8 |
| Treated | [1] 13 | 5 | 6 | 1 |

[1] Of these 8 are very heavily rooted.

*Example 2*

A series of 16 yew cuttings is soaked for 3⅓ hours with an aqueous solution containing 15 milligrams 4-chlorophenoxyacetic acid per liter, while another series is soaked in water for purposes of comparison. The cuttings are then placed in clean sand and watered occasionally. After several weeks they are examined for the extent of rooting. The results are indicated by the following table.

| Series | Extent of Rooting | | | |
|---|---|---|---|---|
| | Heavy | Medium | Light | No Roots |
| Treated | 2 | 3 | 6 | 5 |
| Water check | 0 | 0 | 7 | 9 |

These results show definite root stimulating effect as evident by the larger number of heavy rootings and illustrate the application of the invention to the propagation of plants from cuttings. This treatment is equally applicable to other varieties of plants and is useful for the propagation of not only the ornamental and flowering variety of plants such as holly, Taxus, Forsythia, Althea, barberry, quince, Hydrangea, lilac, privet, rose, Spirea, bittersweet and others, but also for economically important plants such as apple, grape, citrus, peach, pear, etc. For such propagations either dilute aqueous solutions of the synthetic plant hormone in concentrations ranging from 3 to 200 milligrams per liter or compounded dusts or powders containing 0.1 to 5 per cent or more of the active ingredient may be used. The concentration will necessarily depend upon the variety or species of plants which, of course, vary in their sensitivity to such treatment. The duration of treatment or exposure to these stimulants will vary from about 1 hour to 2 or more days, again depending upon the plant and the concentration.

In comparing the intensity of the hormone-like activity of compounds it is customary to apply lanolin pastes of the compound to two-week old tomato seedlings. The paste is applied to the stem at and below the highest branch or internode by means of a glass rod. Typical hormone-like effects are characterized by epinasty of the leaves and curvature of the stem occurring within several hours and by callous tissue developing at the point of application after several days. Such hormone-like responses characterized known plant stimulants such as gamma-3-indolebutyric acid and 1-naphthaleneacetic acid, and comparably characterize the compounds of the present invention. Thus, such compounds as 2-chlorophenoxyacetic, 4-chlorophenoxyacetic, 4-bromophenoxyacetic, 2,4-dichlorophenoxyacetic acids and N-(4-chlorophenyl)glycine give the characteristic responses in comparable degree to the more effective known stimulants. In general the response obtained is much more intense than with the parent unhalogenated compounds. For example, N-(4-chlorophenyl)glycine showed definite response inside of four hours under conditions in which N-phenylglycine was wholly ineffective.

The superficial effects characterized by swelling, twisting, and bending of the test plant and development of callous tissue is presumably due to some specific action on the cellular development of the plant, particularly the cell wall tissue. For this reason, the synthetic plant hormones are effective in regulating the deposition of abscission tissue connecting the plant organs, leaves, blossoms, and fruit to the plant stem or stamen. From the practical standpoint, therefore, the present synthetic plant hormones are useful in controlling or delaying the fall of leaves, blooms, and fruit. The following example illustrates an important application to cut evergreens such as Christmas trees.

*Example 3*

A number of white spruce (New Hampshire) limbs are thoroughly sprayed with a $^1/_{10000}$ water solution of present synthetic hormones and then placed in a constant temperature room running at 82° F. and about 30 per cent relative humidity. For purposes of comparison, a control group is untreated but simply sprayed with water. Six days later the weight of drop needles and needles remaining on the limbs is determined and the per cent drop calculated. The results are summarized as follows:

| Treatment with | Per cent Drop |
|---|---|
| 2-Chlorophenoxyacetic acid | 5.7 |
| 4-Chlorophenoxyacetic acid | 12.1 |
| Untreated—water check | 100.0 |

It will be seen from the above table that the abscission of the needles in terms of per cent drop is decreased appreciably by treatment with the present synthetic hormones, thus extending the good appearance of the plants for such ornamental purposes.

The present compounds can also be applied to plants not only for delaying the abscission of leaves and needles but also for preventing the premature fall of fruits, particularly apples. For such an application, the compounds are applied several days in advance of the time at which these falls are apt to occur. Such varieties of apple as Stayman Winesap, Delicious, McIntosh and Williams are effectively prevented from premature falling or wind falling by this treatment. The application is carried out by mixing the compound with a suitable diluent or powdery carrier and thus may be sprayed or dusted on the plant or tree. For spraying purposes, a water solution, suspension, or emulsion containing from 1–200 grams per 100 gallons of water or approximately from a dilution of $^1/_{400000}$ to $^1/_{2000}$ can be used. With such sprays may be incorporated other adjuvants serving to improve contact and coverage on the tree or plant. Compositions of talc, clay, flour, and the like, containing from 2 to 100 parts per 100,000 can also be used. Such compositions may vary in these limits depending upon the type of plant, time and frequency of treatment. In some cases even lower or higher concentrations may be necessary.

The compounds of this invention are very useful in stimulating and increasing the germination of seeds and tubers as well as the growth of plants therefrom. For this purpose they may be applied by either mixing the seeds with dusts made from talc, clay, or flour or by immersing the seeds in dilute aqueous solution or suspension. The treatment of seeds may also be carried out simultaneously with any treatments for preventing the rot or any fungus attack on the seeds. In applying the dust treatment the concentration of active ingredient should be from 0.5 to 5 per cent, while a much lower concentration will suffice for the aqueous solution, namely from 0.005 to 0.5 per cent.

Another method for regulating plant growth by the use of the present compounds consists of incorporating these halogen aryl organic acids in fertilizers and plant foods or nutrients such as manure, bone meal, peat, ground hulls, dried blood, ground phosphate, potash, and urea products. This may be regarded as fortifying the plant foods. To obtain a uniform mixture the present compounds may be added in pure form or, preferably, diluted with a dust or water solution, dusted or sprayed into the fertilizer and then mixed either by spading or, with large quantities, in the usual type of mixing mills. For such hormonized fertilizers, the suitable concentrations will range from 0.002 oz. to 0.2 oz. per ton of fertilizer.

Another application of the synthetic plant hormones for which the present compounds are also particularly suitable is the production of parthenocarpic or seedless variety of fruit. This is accomplished more expeditiously, particularly on large scale by spraying the flower buds, preferably several times while flowering continues, with dilute aqueous solutions of the compounds, ranging from a concentration of 0.05 to 1.0 g. or more per liter. The concentration for the optimum results will vary with the variety of plant, season, frequency of treatment, etc. Parthenocarpic or seedless fruit can thus be developed in the case of such plants as tomato, squash, cucumber, watermelon, pepper, eggplant, etc.

While I have disclosed my invention with reference to particular applications it is to be understood that it is not limited in these respects but is directed to the application of the particular regulant described in any manner which leads to alteration, i. e., regulation and control of the growth characteristics of plants. The general characteristic of a plant stimulant is that of modifying the development of the plant, not simply as in the case of a fertilizer by providing a more proper food but actually by altering and controlling the growth characteristics of the plant in the various ways already set forth, nor are they to be confused with plant poisons which simply alter and destroy. Additionally, the plant stimulant is effective in minute amounts, the effective concentration being easily set forth in parts per million or milligrams per liter.

Since many widely differing embodiments of the invention may be made it is to be understood that such modifications as come within the spirit of the invention are intended to be included within the scope of the claims.

I claim:

1. A plant regulant composition containing as an essential active ingredient a compound selected from the group consisting of 2,4-dichlorophenoxyacetic acid, its esters, amides, and salts.

2. A plant regulant composition containing as an essential active ingredient a compound selected from the group consisting of 2,4-dichlorophenoxyacetic acid, its esters, amides, and salts, together with a finely divided diluent.

3. A fortified plant nutrient composition comprising a finely divided plant nutrient and a minor amount of a compound selected from the group consisting of 2,4-dichlorophenoxyacetic acid, its esters, amides, and salts.

4. A plant regulant composition containing as an essential active ingredient a compound selected from the group consisting of 2,4-dichlorophenoxyacetic acid, its esters, amides, and salts, together with a wetting agent.

5. A plant regulant composition containing as an essential active ingredient an ester of 2,4-dichlorophenoxyacetic acid.

6. In the propagation of plants the method of regulating the growth characteristics of the plant which comprises treating the plant with a compound selected from the group consisting of 2,4-dichlorophenoxyacetic acid, its esters, amides, and salts.

7. In the propagation of plants the method of regulating the growth characteristics of the plant which comprises treating the plant with a compound selected from the group consisting of 2,4-dichlorophenoxyacetic acid, its esters, amides, and salts together with a finely divided diluent.

8. In the propagation of plants the method of regulating the growth characteristics of the plant which comprises treating the plant with a finely divided plant nutrient and a minor amount of 2,4-dichlorophenoxyacetic acid, its esters, amides, and salts.

9. In the propagation of plants the method of regulating the growth characteristics of the plant which comprises treating the plant with a compound selected from the group consisting of 2,4-dichlorophenoxyacetic acid, its esters, amides, and salts together with a wetting agent.

10. In the propagation of plants the method of regulating the growth characteristics of the plant which comprises treating the plant with an ester of 2,4-dichlorophenoxyacetic acid.

JOHN F. LONTZ.

REFERENCES CITED

The following references are of record in the file of this patent:

UNITED STATES PATENTS

| Number | Name | Date |
|---|---|---|
| 2,396,513 | Jones | Mar. 12, 1946 |

OTHER REFERENCES

Pokorny, "Some Chlorophenoxyacetic Acids," J. Am. Chem. Soc., vol. 63 (June 1941) p. 1768.

Bischoff, Ber. Deut. Chem., vol. 33 (1900), pp. 1603–1605.

Thompson, "Gardener's Assistant," pp. 62 and 63, 1878.